2,991,317
CYCLOOLEFIN PRODUCTION
Henry G. Sellers, Jr., Auburn, Ala., and Antonio A. Sekul, Jackson, Miss., assignors, by mesne assignments, to Cities Service Research and Development Company, New York, N.Y., a corporation of New Jersey
No Drawing. Filed Mar. 25, 1959, Ser. No. 801,730
4 Claims. (Cl. 260—666)

This invention relates to the production of cycloolefins and particularly 1,5-cyclooctadiene and substituted 1,5-cyclooctadienes.

In the dimerization of conjugated open chain diolefinic compounds, the primary products are ordinarily closed chain cycloolefins and cycloolefins having side chains. For example, in the dimerization of butadiene, the normal primary products are 1,5-cyclooctadiene and vinylcyclohexene (4-vinylcyclohexene). Various methods have been used to produce cycloolefins from conjugated open chain diolefinic compounds, including thermal reactions, similar reactions utilizing a solid contact material possibly functioning as a catalyst such as silica, alumina, and glass particles, and catalytic processes designed to provide a high percentage conversion of butadiene to products and a high ratio of cyclooctadiene to vinylcyclohexene in the product. In addition to cyclooctadiene and vinylcyclohexene, the reaction products of the "dimerization" of butadiene normally include unreacted butadiene, small proportions of compounds boiling at temperatures other than the boiling points of vinylcyclohexene and cyclooctadiene including trimers such as cyclododecatriene, and higher boiling or non-distillable polymeric products.

A desired result is to control the nature of the reaction to give a preponderance of the desired constituent of the reaction product. Thus, when the object is to obtain cyclooctadiene from butadiene, while it is desirable to have a high proportion of butadiene converted to product, it is also desirable to obtain a high proportion of cyclooctadiene based upon the weight of butadiene converted to product. Numerous catalysts have been proposed and tested to obtain this result, although few have been found satisfactory. Relatively successful known catalysts include bis(triphenylphosphite) nickel dicarbonyl, of the empirical formula $((C_6H_5O)_3P)_2Ni(CO)_2$ bis(triphenylphosphine) nickel dicarbonyl, and similar compounds in which the phenyl groups are replaced by methyl groups. Cobalt carbonyl complexes such as $((C_6H_5)_3PCo(CO)_3)_2$ and $((C_6H_5O)_3PCo(CO)_3)_2$ and similar iron carbonyl complexes are suggested in the literature as being inoperable. Other compounds tested by others include cobalt and iron nitrosocarbonyls, iron carbonyl iodides, and other derivatives having similar structures. Any catalyst or initiator which substantially alters a comparable thermal reaction to give a greater selectivity for the desired product is considered successful.

It is an object of this invention to provide a process for the preparation of olefinic compounds.

It is a further object of this invention to prepare cycloolefinic compounds having at least eight carbon atoms and at least two olefinic linkages in the ring from open chain conjugated diolefins utilizing a new catalyst for the reaction.

It is an additional object of this invention to prepare cycloolefinic compounds utilizing organostibine nickel carbonyls, having the empirical formula $(R_3Sb)_2Ni(CO)_2$ where R is alkyl, aryl, heterocyclic or other organic radical, particularly bis(triphenylstibine) nickel dicarbonyl, as catalyst.

Other objects will be apparent to those skilled in the art from a consideration of the following description.

In general, the catalyst may be used similarly to other known catalysts for selectively dimerizing an open chain conjugated diolefin to cycloolefins. Thus, the reaction may be conducted in the presence or in the absence of an added solvent. The process may be batch, semi-continuous or continuous. Temperatures may range from about 90° C. to about 250° C. Operable pressures range from about atmospheric to 1000 p.s.i.g. and above, and generally the time for the reaction depends upon the temperature. A number of open chain diolefins, preferably in a gaseous or vapor state when at room temperature and atmospheric pressure, may be used. The concentration of catalyst may range from about .5% to about 10%. Compounds which inhibit the production of higher polymers are sometimes useful, as are dehydrating agents and catalyst "activators." Reaction vessels may be of stainless steel, carbon steel, or may be lined with non-metallic materials such as glass.

The starting material for this invention is a conjugated open chain diolefin, preferably one which is in a gaseous or vapor state at room temperature and atmospheric pressure, and preferably 1,3-butadiene. Other conjugated open chain diolefins, particularly 1,3-diolefins include 2-methyl-1,3-butadiene (isoprene); 1,3-pentadiene (piperylene); phenyldiolefins; 2-chloro-1,3-butadiene (chloroprene); 2,3-dichloro-1,3-butadiene; and 2,3-dimethyl-1,3-butadiene. Other partially substituted halogen derivatives may be used, including mixed halogen derivatives such as chlorfluoro-1,3-butadienes. Other open chain conjugated diolefins which form cycloolefins having at least eight carbon atoms in the ring may also be used, an example being 2,4-hexadiene. If desired, peroxides may be removed from the diolefin feed by treatment with ferrous salts, thiosulfates, or sulfites according to available methods.

It is sometimes desirable but not essential to use a polymerization inhibitor to prevent the open-chain diolefins from polymerizing into products in addition to cycloolefins. Such inhibitors are recognized in the art and encompass mono- or polynuclear mono- or polyphenols, including phenol, catechol, p-tertiary-butylcatechol, resorcinol, 2-4-dimethyl-6-tertiary-butylphenol, tertiary-amyl phenols, hydroquinones, 2,5-ditertiary-butyl-1,4-benzoquinone, other quinones, phloroglucinol, pyrogallol, and naphthols; also amines, including N,N'-diisopropyl-p-phenylenediamine, aniline, p-N-diethylaminoaniline, naphthylamines, triethylamine, and phenothiazine; also aromatic polynitro compounds, picric acid, and terpenes. If present or added, an amount of polymerization inhibitor of from 0.01 to 4% by weight of diolefin starting material ordinarily gives satisfactory control of unwanted by-products. Amounts in the neighborhood of 5% or more may be detrimental to the reaction.

Where a solvent is utilized according to the invention, those known in the art are suitable. Thus benzene, petroleum ethers, petroleum naphtha, tetrahydrofuran, toluene, p-cymene, 1,5-cyclooctadiene, and dicyclopentadiene, alone or in admixture, are useful. Other similar materials for example, other hydrocarbon solvents, may be used. The vapor pressure of the selected solvent may influence the selection of useful conditions, such as maximum temperature.

In batch reactions the time may vary from a few minutes to several hours, for example from ten minutes to twenty-four hours. In continuous reactors, .2 to 4 volumes of liquid diolefin per reactor volume per hour may be used. Time is of course related to temperature, catalyst concentration, pressure, and other variables.

Ordinarily precautions to exclude moisture are satisfactory in practicing this invention. Thus, in conducting batch reactions, in which the diolefin such as butadiene is ordinarily fed into the reaction vessel in liquid form at relatively low pressure, it is necessary to use very cold reaction vessels. In cooling such containers, it was found that a heavy coating of frost formed upon the interior thereof, and merely removing this coating of frost by wiping was found to be adequate in minimizing the amount of moisture present. It may be beneficial to pretreat materials present in the reaction mixture, such as butadiene or organic solvent, if used, with a dehydrating agent, or to incorporate such a dehydrating agent in the reaction mixture. Suitable for this are ethylene oxide, calcium oxide, calcium carbide, and calcium sulphate. Solid dehydrating agents are preferably powdered.

It is to be understood that the specific isomers mentioned above or as understood in the art are the ones intended wherever the general name of a group of isomers is used for convenience. Thus, wherever "butadiene" is mentioned, 1,3-butadiene is the isomer referred to. Similarly, the cis-cis isomer of 1,5-cyclooctadiene is the geometrical isomer of this invention, and "diolefin" means an open chain conjugated diolefin.

Some of the terminology used herein, as applied to butadiene for example, is as follows:

$$\text{Conversion} = \frac{\text{wt. butadiene consumed}}{\text{wt. total butadiene fed}} \times 100$$

$$\text{Selectivity} = \frac{\text{wt. single product}}{\text{wt. butadiene consumed}} \times 100$$

$$\text{Yield} \frac{(\text{selectivity} \times \text{conversion})}{(100)}$$

$$= \frac{\text{wt. single product}}{\text{wt. total butadiene fed}} \times 100$$

Unreacted diolefin is advantageously recycled, although the values for conversion, selectivity, and yield given herein are for a single "pass" without recycling.

The preferred catalyst was prepared by reacting nickel tetracarbonyl (1.9 ml., 2.4 g., 0.014 mole) and a solution of triphenylstibine (10.0 g., 0.028 mole) in 100 ml. of ether. The resulting solution was shaken and allowed to stand overnight. The solvent was removed, with the aid of vacuum, until 10 ml. remained. Then 50 ml. of petroleum ether was added to cause precipitation. The precipitate was filtered and found to be 5.0 g. of pale, bluish white powder. The reaction proceeds generally according to the equation:

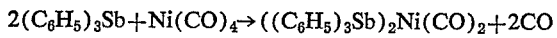

$$2(C_6H_5)_3Sb + Ni(CO)_4 \rightarrow ((C_6H_5)_3Sb)_2Ni(CO)_2 + 2CO$$

The compound triphenylstibine nickel tricarbonyl is also considered to be present. In place of phenyl groups the catalyst of this invention may have methyl, ethyl, cyclohexyl, or other groups.

The catalyst may be used alone or with other compatible catalysts. For example, catalysts which may be used in conjunction therewith are bis(triphenylphosphite) nickel dicarbonyl and bis(triphenylphosphine) nickel dicarbonyl.

In order to distinguish the closed chain cycloolefinic compounds of this invention from higher polymers, the word "oligomers" may be used to designate compounds sometimes called dimers, trimers, and tetramers, for instance.

*Example 1*

90 g. of butadiene, 2.0 g. bis(triphenylstibine)nickel dicarbonyl prepared as above, 4.0 g. dicyclopentadiene catalyst activator, 1 g. powdered calcium carbide, 0.1 g. p-tertiary-butyl-catechol, and 26 g. benzene were placed in a reaction bomb and gradually raised to a temperature of 110° C. The time necessary to reach the reaction temperature of 110° C. was slightly over one hour. The temperature varied slightly, rising to 126° C., and was held between 110° and 126° C. for 4.75 hours. By weight, 34.4% of the butadiene was converted to products, and the selectivity for cyclooctadiene was approximately 17%. Vinylcyclohexene is also obtained. In the absence of the catalyst, very little if any cyclooctadiene is obtained.

*Example 2*

Repeating Example 1 but using 2% catalyst and no additional ingredient other than butadiene, at a temperature of about 165° C., a comparable yield and selectivity is obtained.

*Example 3*

Dichlorocyclooctadiene is obtained when chloroprene is used in place of butadiene in the processes of Examples 1 and 2.

*Example 4*

Using isoprene in place of the monomers of Examples 1 and 2, dimethylcyclooctadiene is obtained.

While the above-described cycloolefins having eight carbon atoms in the ring are the preferred products, other oligomers, having more than eight ring-carbons, may also be obtained. Thus, in Examples 1 and 2, another desirable product obtained is 1,5,9-cyclododecatriene. In addition, quantities of a resinous polymer were obtained. Most of the products of reaction are useful. For instance the cyclodiolefins, cyclotriolefins, etc. may be hydrogenated to cycloaliphatic compounds, vinylcyclohexene may be used as a comonomer in synthetic resins, and the resinous polymer may be used as such.

This application is related to the copending applications of Bosmajian, Serial No. 816,856, filed May 29, 1959; Sellers and Sekul, Serial No. 803,578, filed April 2, 1959; and Sekul and Burks, Serial No. 808,930, filed April 27, 1959. The inventions of these applications may be used in conjunction with the invention of this application.

We claim:

1. In a process for the production of cycloolefinic compounds containing at least 8 carbon atoms and at least two double bonds in the ring comprising the step of subjecting an open chain conjugated diolefin to conditions of elevated temperature and pressure in the presence of a catalyst, the improvement comprising conducting said reaction in the presence of bis(triphenylstibine) nickel dicarbonyl as catalyst.

2. The process of claim 1 in which said elevated temperature is between about 90° C. and about 250° C., said diolefin is selected from the group consisting of butadiene, isoprene, piperylene, and chloroprene, and said catalyst is present in a finite amount below about 10%, based on the weight of said diolefin.

3. In a process for the production of cycloolefinic compounds containing at least 8 carbon atoms and at least two double bonds in the ring comprising the step of subjecting an open chain conjugated diolefin to conditions of elevated temperature and pressure in the presence of a catalyst, the improvement comprising conducting said reaction in the presence of a compound of the formula $(R_3Sb)_2Ni(CO)_2$, where R is an organic radical, as catalyst.

4. The process of claim 3 in which said elevated temperature is between about 90° C. and about 250° C., said diolefin is selected from the group consisting of butadiene, isoprene, piperylene, and chloroprene, and said catalyst is present in a finite amount below about 10%, based on the weight of said diolefin.

References Cited in the file of this patent

UNITED STATES PATENTS

| | | |
|---|---|---|
| 2,631,173 | Hillyer et al. | Mar. 10, 1953 |
| 2,686,208 | Reed | Aug. 10, 1954 |
| 2,686,209 | Reed | Aug. 10, 1954 |